Figure 1:
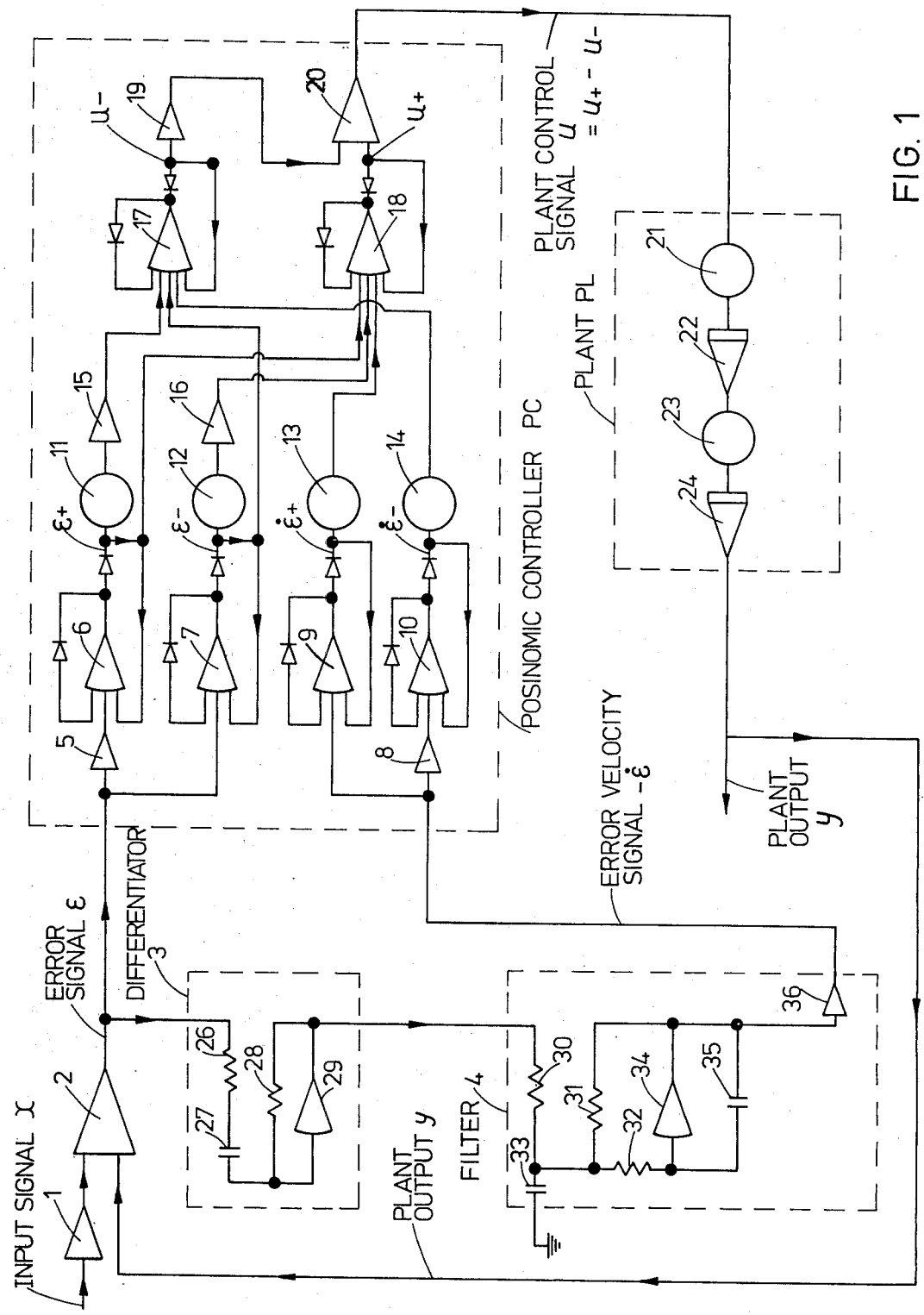

United States Patent [19]
Duggan

[11] 3,925,640
[45] Dec. 9, 1975

[54] CLOSED LOOP CONTROL SYSTEM HAVING PLURAL MODES OF OPERATION

[75] Inventor: Matthew Duggan, Hemel Hempstead, England

[73] Assignee: Rolls-Royce (1971) Limited, London, England

[22] Filed: Mar. 4, 1974

[21] Appl. No.: 447,829

[30] Foreign Application Priority Data
Mar. 6, 1973 United Kingdom............... 10678/73
Apr. 14, 1973 United Kingdom............... 18100/73

[52] U.S. Cl.......... 235/150.1; 235/150.2; 244/77 R; 318/585
[51] Int. Cl.² ....................................... G06B 13/02
[58] Field of Search............ 235/150.1, 151, 151.1, 235/150.2, 150.22; 318/580, 585, 604, 609, 610, 611, 616, 621; 244/77

[56] References Cited
UNITED STATES PATENTS
| | | | |
|---|---|---|---|
| 3,523,193 | 8/1970 | Hutcheon | 318/609 |
| 3,624,367 | 11/1971 | Hamilton et al. | 235/150.2 |
| 3,655,954 | 4/1972 | Speth | 235/150.1 |
| 3,696,282 | 10/1972 | Hirokawa et al. | 318/610 |
| 3,741,474 | 6/1973 | Kawada et al. | 235/150.2 |
| 3,786,242 | 1/1974 | Brooks | 235/151.1 |

Primary Examiner—Felix D. Gruber
Attorney, Agent, or Firm—Cushman, Darby & Cushman

[57] ABSTRACT

A closed loop control system has at least two modes of operation - a rapid response and a damped response whereby an error is reduced to zero rapidly, but with negligible overshoot. The change from one mode to another is made in dependence upon a predetermined ratio between the error and error velocity signals.

9 Claims, 5 Drawing Figures

CLOSED LOOP CONTROL SYSTEM HAVING PLURAL MODES OF OPERATION

This invention relates to control systems and is particularly concerned with control systems for plants in which rapid adjustments are needed to maintain optimum performance of the plant or to prevent damage thereto.

In U.S. Pat. No. 3,816,715, assigned to the common assignee herewith, there is described such a control system which consists of at least two operating circuits each circuit having a different rate of response with switching means for switching one or more of the circuits into operation to receive an input signal, the switching means being controlled in accordance with the value of the input signal, the output signal, error between these signals or their derivatives. The operating circuits are "piecewise" linear, i.e. they operate as linear systems between switch points but the circuits controlling the switching means may operate non-linearly.

Linear control systems or servo mechanisms are systems whose output may be described with sufficient accuracy by linear differential equations with constant coefficients including derivatives of the varying input and output.

Non-linear control systems cannot be so described. A particular property of linear systems is that if they are supplied with a continuous sinusoidal input, then after initial disturbances have died away the output is sinusoidal at the same frequency but usually of different amplitude and phase. A more general property is that if the input to a linear system is increased in a given ratio then the output is increased in the same ratio, i.e. they are not "amplitude sensitive." All non-linear systems lack said particular property by definition and most known non-linear systems lack said general property.

Known examples of amplitude sensitive non-linear systems may differ from linear systems by lack of response to small input amplitudes owing to friction or backlash or to large amplitudes owing to their reaching the maximum rate of response of some component called "saturation." These types of response may be inherent in some devices but are not usually advantageous. Known non-linear methods of control which achieve some useful results include systems whose rate of response increases abruptly for large errors, and adaptive systems which include devices which predict the last moment to apply full corrective power. The former have minor effects and are almost always unsatisfactory near the boundary where the rapid response just comes in, whilst the latter either produce violent corrections for small errors or adapt too slowly so that damage may occur to the plant being controlled.

A typical plant which is difficult to control by conventional linear methods is a plant known as a double integrator, an example of which is a plant whose output accelerates in proportion to a disturbance applied to it.

It is an object of the present invention to provide a control system of the "piecewise" linear type which is capable of controlling a double integrator plant.

According to the present invention there is provided a control system for controlling a plant in accordance with an input signal to the control system, the system comprising means adapted to compare the input signal and a plant output signal to produce an error signal proportional to the difference between the input and output signals, means for producing an error velocity signal proportional to the rate of change of the error signal, means for generating a continuous control signal comprising one of at least two different linear functions of the error and error velocity signals which function is selected according to the values of the error and error velocity signals, the control signal being adapted to control the plant.

Preferably the error signal is used to develop two signals, one being proportional to the positive component of the error signal, and the other being proportional to the negative component of the error signal.

Preferably the error velocity signal is used to develop two signals, one being proportional to the positive component of the error velocity signal, and the other being proportional to the negative component of the error velocity signal.

Preferably means are provided for summing the error signals and the error velocity signals comprising a first summing unit adapted to sum the error signals and that signal which is proportional to the positive component of the error velocity signal, a second summing unit adapted to sum the error signals and that signal which is proportional to the negative component of the error velocity signal, and a third summing unit adapted to sum the outputs of the first and second summing units.

There may be negative feedback of the output of the first summing unit into the second summing unit, and negative feedback of the output of the second summing unit into the first summing unit.

The signal which is proportional to the positive component of the error signal is preferably converted to a negative value prior to being supplied to the first summing unit, and the signal which is proportional to the negative component of the error signal is preferably converted to a negative value prior to being supplied to the second summing unit.

The output from the second summing unit is preferably changed in sign prior to being supplied to the third summing unit.

At least one of the functions of the control signal may be unstable or marginally unstable when in operation.

Preferably there are three functions or modes of the control signal, the first function of the control signal giving an undamped oscillatory system, the second function giving a critically damped system, and the third giving an overdamped system.

Figure 2:
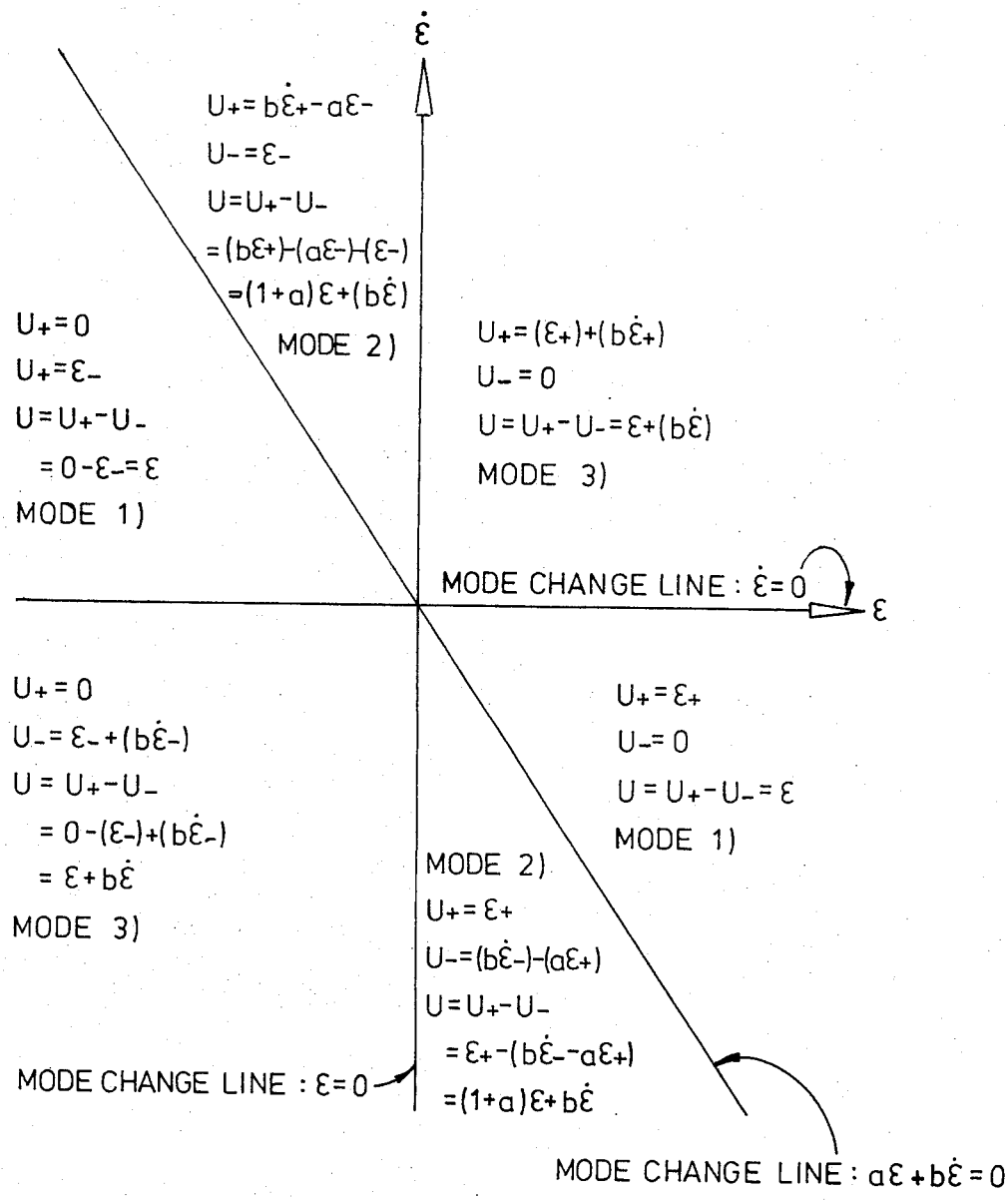
Figure 3:
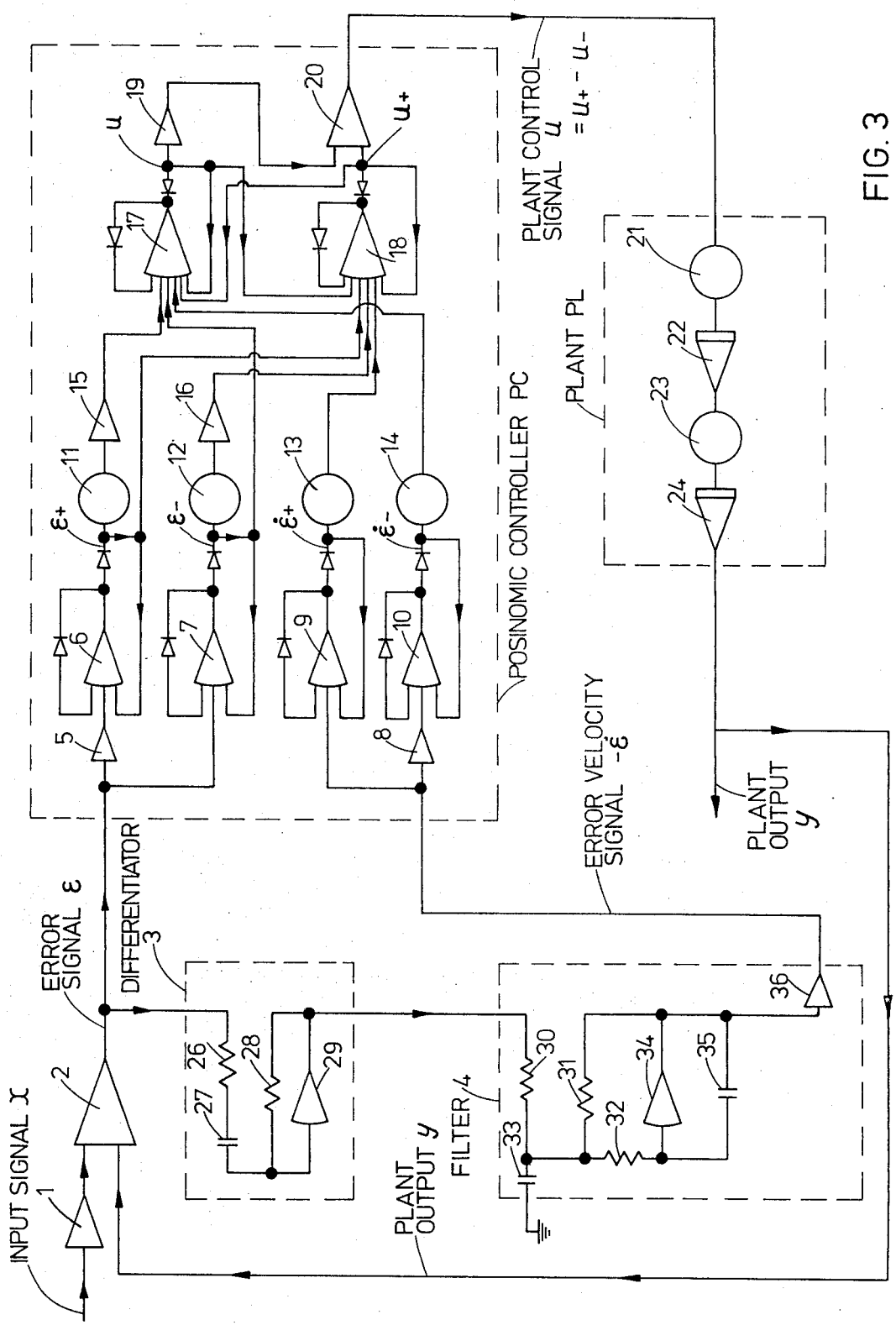
Figure 4:
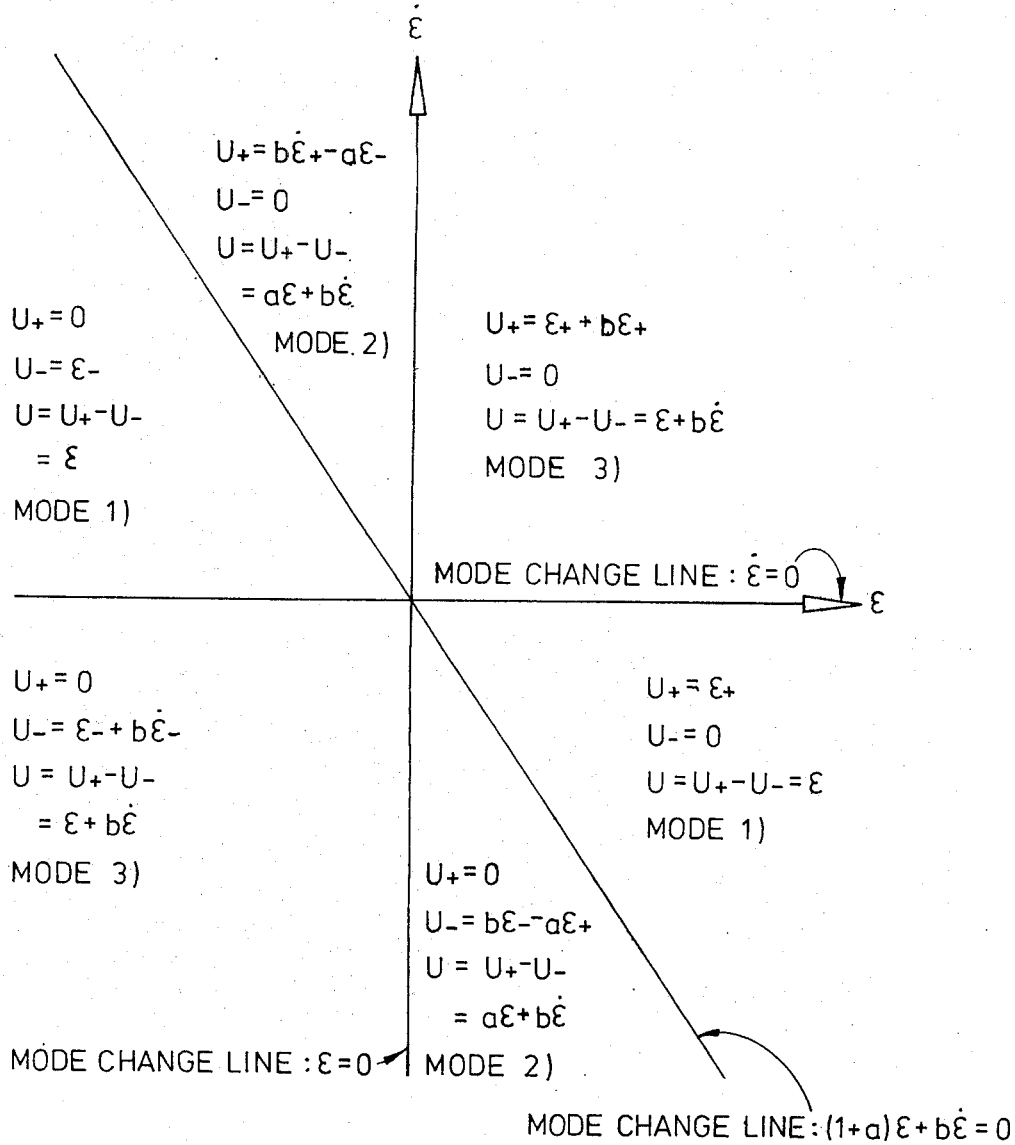
Figure 5:
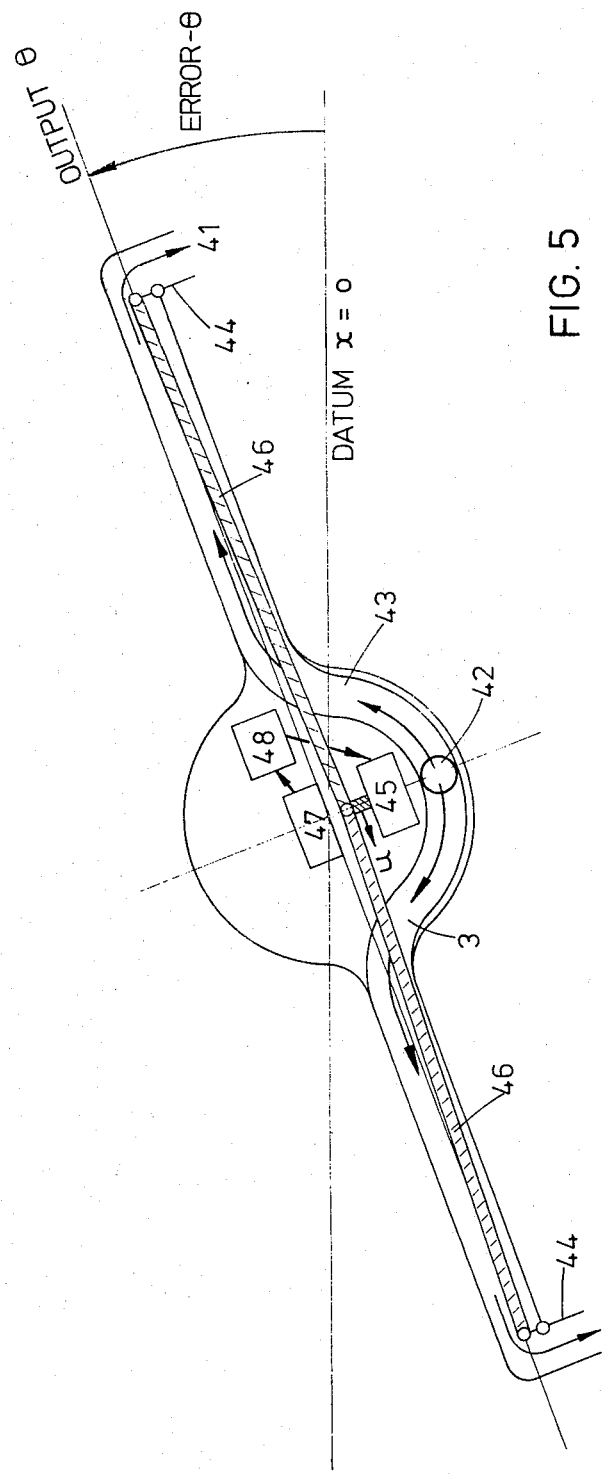

Embodiments of the invention will now be described, by way of example only, with reference to the accompanying drawings in which:

FIG. 1 shows an electrical analogue implementation of a control system according to one embodiment of the present invention for controlling a double integral plant, FIG. 2 is a phase plane diagram illustrating the different functions of the control signal, in the embodiment of FIG. 1, FIG. 3 shows an electrical analogue implementation of another embodiment of the invention, FIG. 4 is a phase plane diagram illustrating the different functions of the control signal in the system illustrated in FIG. 3, and FIG. 5 shows a diagrammatic front view of an aircraft incorporating a control system in accordance with the invention.

In the following embodiments input signals to the control system are split into independent positive and negative component parts, and each component part is converted to a positive signal. The systems in which this occurs will hereinafter be referred to as "posinomic control systems."

In FIG. 1, because of the change of sign imposed by an electrical amplifier, negative voltages do exist in some parts of the controller; the principle of the posinomic control, however, is preserved.

The difference between an input signal, $x$, and the output $y$, of a plant PL is obtained via a sign changing amplifier 1 and a summing amplifier 2 to give an error signal $\epsilon$. The error signal $\epsilon$ is fed through a differentiator 3, consisting of a resistor 26, a capacitor 27, a resistor 28 and a high gain amplifier 29, and then to a filter circuit 4, consisting of resistors 30, 31, 32 capacitors 33 and 35, high gain amplifier 34 and an amplifier 36, to give a negative error velocity signal $-\dot{\epsilon}$.

The filter circuit 4 prevents noise generation and limits the value of $\dot{\epsilon}$ for very fast changes of the error signal $\epsilon$.

The error signal $\epsilon$ and the error velocity signal $-\dot{\epsilon}$ are passed to a posinomic controller PC. The error signal $\epsilon$ is fed through a sign changing amplifier 5 to an amplifier/diode combination 6 which gives the positive part of the error signal, $\epsilon+$, as output; the error signal $\epsilon$ is also fed directly to an amplifier/diode combination 7 which gives the negative part of the error signal as a positive output, $\epsilon-$.

The negative error velocity signal $-\dot{\epsilon}$ from the filter circuit 4 is fed to an amplifier/diode combination 9 to give the positive part of the error velocity signal $\dot{\epsilon}+$, and via a sign changing amplifier 8 to an amplifier/diode combination 10 to give the negative part of the error velocity signal as a positive output $\dot{\epsilon}-$.

The amplifier/diode combinations 6, 7, 9 and 10 effectively give substantially perfect diode characteristics except for the sign change associated with the amplifier.

The signals $\epsilon+$ and $\dot{\epsilon}-$ are passed via gain changer 11 and sign changer 15 and gain changer 14 respectively, to a first summing amplifier/diode combination 17, and the signal $\epsilon-$ is passed directly to the first summing amplifier/diode combination 17. The three signals interact and produce the negative part of the plant input control signal as a negative output $u-$.

Similarly the signals $\epsilon-$ and $\dot{\epsilon}+$ are passed via gain changer 12 and sign changer 16 and gain changer 13 respectively to a second summing amplifier/diode combination 18, and the signal $\epsilon+$ is passed directly to the second summing amplifier/diode combination 18. The three signals interact and produce the positive part of the plant input control signal as a negative output $u+$.

The summing amplifier/diode combinations 17 and 18 perform summing and amplification operations in addition to giving the substantially perfect diode characteristic and sign change.

The output of the first summing amplifier/diode combination 17 is fed via a sign changer 19 to a summing amplifier 20 together with the output from the second summing amplifier/diode combination 18. The output from the summing amplifier 20 forms a plant control signal $u$, which is equal to the difference between the positive and negative parts $u+$ and $u-$. The signal $u$ from the summing amplifier 20 is fed to the plant PL which is a double integral plant and which comprises two gain changers 21 and 23, and two integrators 22 and 24. The output from the integrator 24 is the plant output signal $y$, which is passed to summing amplifier 2 to be compared with the system input signal $x$ to give the error signal, and is used to close the loop.

The control signal $u$ generated by the posinomic controller consists of one of three different linear functions of $\epsilon$ (the error signal) and $\dot{\epsilon}$ (the error velocity signal) according to the condition of the plant and this will be explained later in relation to the phase plane (i.e. according to the relationship between $\epsilon$ and $\dot{\epsilon}$) in FIG. 2.

The equation for $u$ is:
$$u = (u+) - (u-) \text{ where}$$
$$u+ = [(\epsilon+) + (b_1\dot{\epsilon}+)] - (a_1\epsilon-) \quad\quad\quad (1),$$
clearly when $(\epsilon+) + (b_1\dot{\epsilon}+) < (a_1\epsilon-)$, it follows that $u+ = 0$ and where
$$u- = [(\epsilon-) + (b_2\dot{\epsilon}-)] - (a_2\epsilon+) \quad\quad\quad (2),$$
again when $(\epsilon-) + (b_2\dot{\epsilon}-) < (a_2\epsilon+)$, it follows that $u- = 0$ Referring now to FIG. 2 there is shown in graphical or phase plane form the conditions which can exist depending upon the values of the error signal ($\epsilon$) and the error velocity signal ($\dot{\epsilon}$). FIG. 2 is a plot of these two signals in which is shown a linear function of the two signals namely,
$$a\epsilon + b\dot{\epsilon} = 0 \quad\quad\quad (3),$$

For a completely symmetrical posinomic controller (as is usual) the constants in equations (1) and (2) above will be equal:-
$$a_1 = a_2 = a \quad\quad\quad (4),$$
$$b_1 = b_2 = b \quad\quad\quad (5)$$

Therefore FIG. 2 defines three pairs of modes (1 – 3) in which equations (1) and (2) above can be expressed as illustrated in the figure. For example, in mode 1 on the left of the diagram, it is clear that,
$$\epsilon < 0, \dot{\epsilon} > 0,$$
also the values of $\epsilon$ and $\dot{\epsilon}$ when applied to function $a\epsilon + b\dot{\epsilon}$ give a value to this function which is negative i.e. $a\epsilon + b\dot{\epsilon} < 0$.

From (1) above,
$$b\dot{\epsilon} < a\epsilon-$$
and therefore $u+ = 0$
From (2) above
$$u- = (\epsilon-) + 0 - 0 = \epsilon-$$
therefore $u = -(\epsilon-) = \epsilon$ The expression shown in each of the other modes can be similarly evolved and it will be seen that the abscissa and ordinate lines and the function line $a\epsilon + b\dot{\epsilon} = 0$ each comprise a mode change line defining between them six modes which because of identical conditions form the three pairs of modes referred to above. It is seen that these provide three alternative control signals which can be obtained:-

Mode 1) $u = \epsilon$ gives an undamped oscillatory system
Mode 2) $u = (1 + a)\epsilon + b\dot{\epsilon}$ gives a critically damped system
Mode 3) $u = \epsilon + b\dot{\epsilon}$ gives an overdamped system In a practical application the gain constants $a1$, $b1$, $a2$ and $b2$ in the posinomic controller would be adjusted to give the required response characteristics of the complete system.

For example, the constants $a1$, $b1$, $a2$, $b2$ bear a relationship to, such as being ten times, the settings on gain changers 12, 13, 11 and 14, this amplification being obtained in amplifier/diode combinations 17 and 18.

The absolute magnitude of $a$ and $b$ determine the amounts of damping in the damped modes (the larger they are, the heavier the damping) which in turn govern the amount of overdamping or overshoot the system will have in a step response.

FIG. 3 shows another embodiment of the invention and the circuitry is exactly the same as that of FIG. 1 except that the output of the first summing amplifier/diode combination 17 is fed to the input of the second summing amplifier/diode combination 18, and the output of the second summing amplifier/diode combination 18 is fed to the input of the first summing amplifier/diode combination 17. This feedback is known as mutual feedback inhibition and avoids the co-existence of the two outputs $u+$ and $u-$. This allows an improvement in the performance of the control system and simplifies the adjustment process required to match the system to different plants.

In this embodiment the equation for $u$ is as follows:
$$u = (u+) - (u-)$$
Where,
$$u+ = [(\epsilon+) + (b_1\dot{\epsilon}+)] - [(a_1\epsilon-) + (u-)]$$
but where
$$[(\epsilon+) + (b_1\dot{\epsilon}+)] < [(a_1\epsilon-) + (u-)]$$
then $u+ = 0$
Also,
$$u- = [(\epsilon-) + (b_2\dot{\epsilon}-)] - [(a_2\epsilon+) + (u+)]$$
and where
$$[(\epsilon-) + (b_2\dot{\epsilon}+)] < [(a_2\epsilon+) + (u+)]$$
then $u- = 0$ As before the constants $a1$, $b1$, $a2$ and $b2$ may correspond to ten times the settings on gain changers 12, 13, 11 and 14 respectively, according to FIG. 3, with the first and second summing amplifier/diode combinations 17 and 18 amplifying the signals passing through these gain changers by a factor of 10.

The regions in which each equation operates are shown in the phase plane in FIG. 4.

The three functions which the control signal $u$ adopts produce the three different modes of operation when the controller and plant form a closed loop:- Mode 1) $u = \epsilon$ gives an undamped oscillatory system Mode 2) $u = a\epsilon + b\dot{\epsilon}$ gives a critically damped system Mode 3) $u = \epsilon + b\dot{\epsilon}$ gives an overdamped system These are summarised in FIG. 4.

In a practical application the gain constants $a1$, $b1$, $a2$ and $b2$ in the posinomic controller would be adjusted to give the required response characteristics of the complete system.

The ratio $(1 + a)/b$ decides the slope of the oblique mode change line on the phase plane and in general, the steeper this is, the faster the response of the system.

As before the absolute magnitude of $a$ and $b$ determine the amounts of damping in the damped modes (the larger they are, the heavier the damping) which in turn govern the amount of overshoot the system will have in a step response.

In FIG. 5 there is shown a posinomic controller used in conjunction with an air jet system to implement the attitude control of a hovering VTOL aircraft.

Air jets 41 are supplied with air from a compressor 42 via ducts 43. The total flow of air is constant, but the ratio of flow between each of the two air jets 41 can be altered by means of flap valves 44 which are moved by an actuator 45 via linkages 46. A sensing device 47 detects departures of the attitude of the aircraft from a horizontal datum and generates an error signal proportional to the deviation $\theta$.

This error signal is fed to a control device 48 which differentiates it and uses the resultant error velocity signal along with the error signal to produce a control signal $u$ by means of a posinomic controller network as in FIG. 1 included in device 48. This control signal is fed to the actuator 45 which moves the linkages 46 in proportion to the magnitude of the control signal. This movement alters the positions of the flap valves 44, which causes an alteration in the relative air flow between the two jets so as to produce a torque acting on the aircraft in such a manner as to decrease the deviation $\theta$.

Whilst a control system has been described which utilises electronic components, it will be appreciated that the posinomic control system may utilise mechanical, fluidic or other suitable elements to achieve the appropriate summing of the signals.

The embodiments described above can be classed as "posinomic piecewise-linear control" systems.

A posinomic control system uses a number of interacting positive signals to achieve the piecewise-linear type of control. These positive signals are obtained from the error and the error velocity signals of the system by using diodes or their equivalents. The interaction of the positive signals causes either partial cancellation or enhancement of the net signal which is used as the controlling input signal to the plant. This cancellation or enhancement takes place according to the state of the complete system and is such as to stabilise the response of the system to disturbances of the input.

In any piecewise linear control system two or more different modes of operation are used. Each of these modes corresponds to a linear control. One mode has a fast response, and possibly unstable, and another must resist rapid change so as to provide a degree of damping to excursions of the system. The modes are used according to the state of the system to achieve overall high speed and stability of response.

The posinomic controller for a double integral plant employs three modes (one fast and two damped), and the change from one to another occurs as certain of the various positive signals reach zero. The diodes prevent negative signals occurring and thus implement the changes of mode. There are no switches in the system; the input signals change continuously but their rates of change of slope change discontinuously as said signals become positive.

I claim:

1. A closed loop control system for controlling a plant in accordance with an input signal to the control system, the system comprising means for receiving an input signal into the plant, means for generating a plant output signal, a comparator for comparing the input and output signals to produce an error signal proportional to the difference between the input and output signals, means for producing an error velocity signal proportional to the rate of change of the error signal, means responsive to said error and said error velocity signals for generating at least two different linear functions of the error and error velocity signals, each of said linear functions corresponding to a different mode of operation of said control system, means for changing from one linear function to another depending upon a predetermined ratio between the error signal and the error velocity signal, and means for producing a continuous plant control signal varying in accordance with one of said linear functions.

2. The control system of claim 1 wherein said means for generating said linear functions includes means responsive to said error signal for deriving a signal proportional to the positive component of said error signal and a second signal proportional to the negative component of said error signal.

3. The control system of claim 1 wherein said means for generating said linear functions includes means responsive to said error velocity signal for deriving a signal proportional to the positive component of the error velocity signal and a second signal proportional to the negative component of said error velocity signal.

4. The control system of claim 1 wherein said means for generating said linear functions includes means responsive to said error signal for generating a signal proportional to the positive component of the error signal and a signal proportional to the negative component of the error signal, means responsive to said error velocity signal for generating a signal proportional to the positive component of the error velocity signal, and a signal proportional to the negative component of the error velocity signal, and means for summing said error and said error velocity proportional signals, said means including a first summing unit for summing the error signal and said signal proportional to the positive component of the velocity of error signal, a second summing unit for summing the error signal and said signal proportional to the negative component of said error velocity signal, and a third summing unit for summing the outputs of said first and second summing units.

5. The control system of claim 4 further comprising means for feeding back the output of said first summing unit to the input of said second summing unit along a negative feedback path and means for feeding the output of said second summing unit into the input of said first summing unit along a negative feedback path.

6. The control system of claim 4 wherein said means for generating said linear function includes means for converting said signal proportional to the positive component of said error signal to a negative value before being coupled to the input of said second summing unit and means for converting said signal proportional to the negative component of said error signal to a negative value before being supplied to the input of said first summing unit.

7. The control system of claim 4 wherein said means for generating said linear functions includes means for inverting the output from said second summing unit before said output signal is supplied to said third summing unit.

8. The control system of claim 1 wherein at least one of the functions of the control signal is unstable or marginally unstable when in operation because of zero or small damping.

9. The control system of claim 1 wherein the control signal comprises one of three different linear functions, the first function providing an undamped oscillatory system, the second function providing a critically damped system, and the third function providing an overdamped system, and wherein said plant is a double integral plant.

* * * * *